United States Patent
Zhai (10) Patent No.: US 7,251,367 B2
(45) Date of Patent: Jul. 31, 2007

(54) SYSTEM AND METHOD FOR RECOGNIZING WORD PATTERNS BASED ON A VIRTUAL KEYBOARD LAYOUT

(75) Inventor: Shumin Zhai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 10/325,197

(22) Filed: Dec. 20, 2002

(65) Prior Publication Data

US 2004/0120583 A1 Jun. 24, 2004

(51) Int. Cl.
*G06K 9/72* (2006.01)
(52) U.S. Cl. ..................................... 382/229
(58) Field of Classification Search ................. 382/229
See application file for complete search history.

(56) References Cited

U.S. PATENT DOCUMENTS

| 5,579,471 A * | 11/1996 | Barber et al. ............... 715/700 |
| 7,098,896 B2 | 8/2006 | Kushler et al. |
| 2005/0025363 A1* | 2/2005 | Lui et al. .................... 382/187 |
| 2005/0146508 A1 | 7/2005 | Kirkland et al. |

OTHER PUBLICATIONS

S. Zhai et al., "Performance Optimization of Virtual Keyboards, Human-Computer Interaction," vol. 17 (2, 3), 229-270, 2002.

G. Kurtenbach et al., "User Learning and Performance with Marking Menus," Proc. CHI. 1994, pp. 258-264.
C.C. Tappert, "Speed, accuracy, flexibility trade-offs in on-line character recognition", Research Report RC13228, Oct. 28, 1987, IBM T.J. Watson Research Center, 1987.
J. Mankoff et al., "Cirrin: A Word-Level Unistroke Keyboard For Pen Input," pp. 213-214, 1998.
K. Perlin, "Quickwriting: Continuous Stylus-Based Text Entry," pp. 215-216, 1998.
D. Venolia, et al., "T-Cube: A Fast, Self-Disclosing Pen-Based Alphabet," pp. 265-270, 1994.
D. Goldberg et al., "Touch-Typing With a Stylus," 1993.
D. Ward et al., "Dasher—A Data Entry Interface Using Continuous Gestures and Language Models," pp. 129-137, 2000.
Kristensson, Per-Ola, "Design and Evaluation of a Shorthand Aided Soft Keyboard," Master's Thesis in Cognitive Science Department of Computer and Information Science, Linköping University, Sweden, Aug. 28, 2002.

* cited by examiner

*Primary Examiner*—Joseph Mancuso
*Assistant Examiner*—Jonathan Schaffer
(74) *Attorney, Agent, or Firm*—Samuel A. Kassatly (57) ABSTRACT

A system augments stylus keyboarding with shorthand gesturing. The system defines a shorthand symbol for each word according to its movement pattern on an optimized stylus keyboard. The system recognizes word patterns by identifying an input as a stroke, and then matching the stroke to a stored list of word patterns. The system then generates and displays the matched word to the user.

60 Claims, 6 Drawing Sheets

SYSTEM AND METHOD FOR RECOGNIZING WORD PATTERNS BASED ON A VIRTUAL KEYBOARD LAYOUT

FIELD OF THE INVENTION

The present invention generally relates to text entry devices for computers, particularly text entry via virtual keyboards for computer-based speed writing that augment stylus keyboarding with shorthand gesturing. Shorthand gestures for words are defined as the stroke sequentially formed by the user after the pattern defined by all the letters in a word on a virtual keyboard.

BACKGROUND OF THE INVENTION

Text input constitutes one of the most frequent computer user tasks. The QWERTY keyboard has been accepted as the standard tool for text entry for desktop computing. However, the emergence of handheld and other forms of pervasive or mobile computing calls for alternative solutions. These devices have small screens and limited keypads, limiting the ability of the user to input text. Consequently, text input has been revived as a critical research topic in recent years. The two classes of solutions that have attracted the most attention are handwriting and stylus-based virtual keyboarding.

Handwriting is a rather "natural" and fluid mode of text entry due to users' prior experience. Various handwriting recognition systems have been used in commercial products. However, the fundamental weakness of handwriting as a text entry method is its limited speed. While adequate for entering names and phone numbers, handwriting is too limited for writing longer text.

Virtual keyboards tapped serially with a stylus are also available in commercial products. The keyboard provided on the screen is typically the familiar QWERTY layout. Stylus keyboarding requires intense visual attention at almost every key tap, preventing the user from focusing attention on text output. To improve movement efficiency, optimization of the stylus keyboard layout has been considered both by trial and error and algorithmically. Using a keyboard layout such as ATOMIK (Alphabetically Tuned and Optimized Mobile Interface Keyboard), text entry is relatively fast. Reference is made to S. Zhai, M. Hunter & B. A. Smith, "Performance Optimization of Virtual Keyboards, Human-Computer Interaction," Vol.17 (2, 3), 229–270, 2002.

The need for entering text on mobile devices has driven numerous inventions in text entry in recent years. The idea of optimizing gesture for speed is embodied in the Unistrokes alphabet. In the Unistrokes alphabet, every letter is written with a single stroke but the more frequent ones are assigned simpler strokes. If mastered, a user could potentially write faster in the Unistrokes alphabet than in the Roman alphabet. The fundamental limitation of the Unistrokes alphabet, however, is the nature of writing one letter at a time.

Quikwriting method uses continuous stylus movement on a radial layout to enter letters. Each character is entered by moving the stylus from the center of the radial layout to one of the eight outer zones, sometimes crossing to another zone, and returning to the center zone. The stylus trajectory determines which letter is selected. While it is possible to develop "iconic gestures" for common words like "the", such gestures are relatively complex due to the fact that the stylus has to return to the center after every letter. In this sense, the Quikwriting method is fundamentally a character entry method.

Cirrin (Circular Input) operates on letters laid out on a circle. The user draws a word by moving the stylus through the letters. Cirrin explicitly attempts to operate on a word level, with the pen being lifted up at the end of each word. Cirrin also attempts to optimize pen movement by arranging the most common letters closer to each other. However, Cirrin is neither location nor scale independent.

It is important to achieve at least partial scale and location independency for the ease and speed of text entry. If all the letters defining a word on the keyboard have to be precisely crossed, the time to trace these patterns cannot be expected to be any shorter than tapping. As an example, if it is desired to draw a line from key "r" to key "d" as part of the word "word", within a tunnel connecting the two keys, such a closed-loop drawing process would take more time and visual attention than tapping "d" after "r". The user must place the pen in the proper position before drawing the word and ensure that the movement of the pen from letter to letter falls within the allowed pen stroke boundaries.

It is also important to facilitate skill transfer from novice behavior to expert performance in text entry by designing similar movement patterns for both types of behavior. The idea of bridging novice and expert modes of use by common movement pattern is used in the "marking menu". Instead of having pull-down menus and shortcut keys, two distinct modes of operation for novice and expert users respectively, a marking menu uses the same directional gesture on a pie menu for both types of users. For a novice user whose action is slow and needs visual guidance, marking menu "reveals" itself by displaying the menu layout after a pre-set time delay. For an expert user whose action is fast, the marking menu system does not display visual guidance. Consequently, the user's actions become open loop marks. However, the marking menu is not used for text entry due to the limited number of items can be reliably used in each level of a pie menu (8 or at the most 12). Reference is made to G. Kurtenbach, and W. Buxton, "User Learning and Performance with Marking Menus," Proc. CHI. 1994, pages 258–264; and G. Kurtenbach, A. Sellen, and W. Buxton, "An Empirical Evaluation of Some Articulatory and Cognitive Aspects of "Marking Menus", "Human Computer Interaction, 1993, 8(1), pages 1–23.

A self-revealing menu approach, T-Cube, defines an alphabet set by cascaded pie menus that are similar to a marking menu. A novice user enters characters by following the visual guidance of menus, while an expert user could enter the individual characters by making menu gestures without visual display. A weakness of the T-Cube is that it works at alphabet level; consequently, text entry using T-cube is inherently slow.

Dasher, another approach using continuous gesture input, dynamically arranges letters in multiple columns. Based on preceding context, likely target letters appear closer to the user's cursor location. A letter is selected when it passes through the cursor; consequently, cursor movement is minimized. This minimization, however, is at the expense of visual attention. Because the letter arrangement constantly changes, Dasher demands user's visual attention to dynamically react to the changing layout.

One possibility for introducing gesture-based text entry would be the use of shorthand. Traditional shorthand systems are efficient, but hard to learn for the user and difficult to recognize by the computer. Shorthand has no duality; it cannot be used by experts and beginners alike. In addition, shorthand has no basis in a virtual keyboard, so the user cannot identify the required symbol from the keyboard. If the user forgets shorthand symbols, a separate table must be consulted to find the symbol.

What is therefore needed is a form of continuous gesture-based text input that requires minimal visual attention, and that is based on keyboard entry, wherein a system and method recognize word patterns based on a virtual keyboard layout. The need for such system and method has heretofore remained unsatisfied.

SUMMARY OF THE INVENTION

The present invention satisfies this need, and presents a system and associated method (collectively referred to herein as "the system" or "the present system") for recognizing word patterns based on a virtual keyboard layout. The present system combines hand writing recognition with a virtual, graphical, or on-screen keyboard to provide a text input method with relative ease of use. The system allows the user to input text quickly with little or no visual attention from the user.

The design of the present system is based on five principles for achieving gesture-based text input in a virtual keyboard. The first principle is that for word pattern gesturing to be effective, patterns must be recognized independent of scale and location. This is especially critical for small device screens or virtual keyboards such as those on a PDA. As long as the user produces a pattern that matches the shape of the a word pattern defined on the keyboard layout, the system should recognize and type the corresponding word for the user. If so, the users could produce these patterns with much less visual attention, in a more open-loop fashion, and with presumably greater ease and comfort.

The second principle of the current work lies in efficiency. In comparison to hand writing alphabetic or logographic characters such as Chinese, writing a word pattern defined by a stylus keyboard can be much more efficient. Each letter constitutes only one straight stroke and the entire word is one shape. In other words, the present system is a form of shorthand writing.

The present system can be defined on any keyboard layout. However if defined on the familiar QWERTY layout, frequent left-right zigzag strokes would be required because the commonly used consecutive keys are deliberately arranged on the opposite sides of QWERTY. An alternative keyboard layout would be the ATOMIK (Alphabetically Tuned and Optimized Mobile Interface Keyboard) layout. The ATOMIK keyboard layout is optimized to reduce movement from one key to another; consequently, it is also optimized for producing word patterns of minimum length.

The third principle involves the concept of duality, that is the ability of advanced users to primarily use gestures for a increasing set of frequently used words while beginning users primarily use stylus tapping to enter text. Traditional shorthand writing systems, take significant time and effort to master. With the exception of touch-typing on physical keyboards, users are typically reluctant to invest time in learning a human computer interaction skill. A shorthand system defined on a stylus keyboard, however, does not have to contain a complete or even a large set of words, because one can use both tapping and shorthand gesturing. For familiar words whose patterns are well remembered, the user can use gestures. For the less familiar, one can use stylus tapping. Both modes of typing are conducted on the same input surface; the present system distinguishes tapping from stroking, and provides the output accordingly. Consequently, users do not have to learn many gestures before beginning to benefit from the present system.

The fourth principle recognizes that word frequency in a language tends to follow Zipf's law with a highly skewed distribution. Zipf's law models the observation that frequency of occurrence of event f, as a function of its rank i, is a power-law function $f \sim 1/i^\alpha$ with the exponent a close to unity. For example, the 100 most common individual words make up 46% of the entire British National Corpus (BNC). The word "the" alone constitutes over 6% of the BNC. Consequently, a relatively small set of shorthand gestures can cover a large percentage of text input. The use of shorthand equivalents for a small set of common words dramatically increases text input speed for the user.

The fifth principle recognizes that a user's repertoire of shorthand gesture symbols can be gradually expanded with practice, providing a gradual and smooth transition from novice to expert behavior. Gesturing and tapping a word share a common movement pattern that may facilitate skill transfer between the two modes. For a novice user, visually guided tapping is easier. When a word is tapped enough times, the user may switch to the more fluid "expert" mode of shorthand gesturing. If a shorthand gesture is forgotten, one can fall back to taping, which reinforces the pattern and pushes the user back to expert mode.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

ATOMIK: Alphabetically Tuned and Optimized Mobile Interface Keyboard optimized by an algorithm in which the keyboard was treated as a "molecule" and each key as an "atom". The atomic interactions among the keys drove the movement efficiency toward the minimum. Movement efficiency is defined by the summation of all movement times between every pair of keys weighted by the statistical frequency of the corresponding pair of letters. ATOMIK is also alphabetically tuned, causing a general tendency that letters from A to Z run from the upper left corner to the lower right corner of the keyboard, helping users find keys that are not yet memorized. ATOMIK is one exemplary virtual keyboard that can be used in combination with the current invention.

Elastic Matching: A conventional hand writing recognition method. Reference is made to Tappert, C. C., "Speed, accuracy, flexibility trade-offs in on-line character recognition", Research Report RC13228, Oct. 28, 1987, IBM T. J. Watson Research Center, 1987; and Charles C. Tappert, Ching Y. Suen, Toru Wakahara, "The State of the Art in On-Line Handwriting Recognition," IEEE Transactions on Pattern Analysis and Machine Intelligence, Vol.12, No.8, August 1990.

PDA: Personal Digital Assistant. A pocket-sized personal computer. PDAs typically store phone numbers, appointments, and to-do lists. Some PDAs have a small keyboard, others have only a special pen that is used for input and output on a virtual keyboard.

Virtual Keyboard: A computer simulated keyboard with touch-screen interactive capability that can be used to replace or supplement a keyboard using keyed entry. The virtual keys are typically tapped serially with a stylus. It is also called graphical keyboard, on-screen keyboard, or stylus keyboard.

Figure 1:
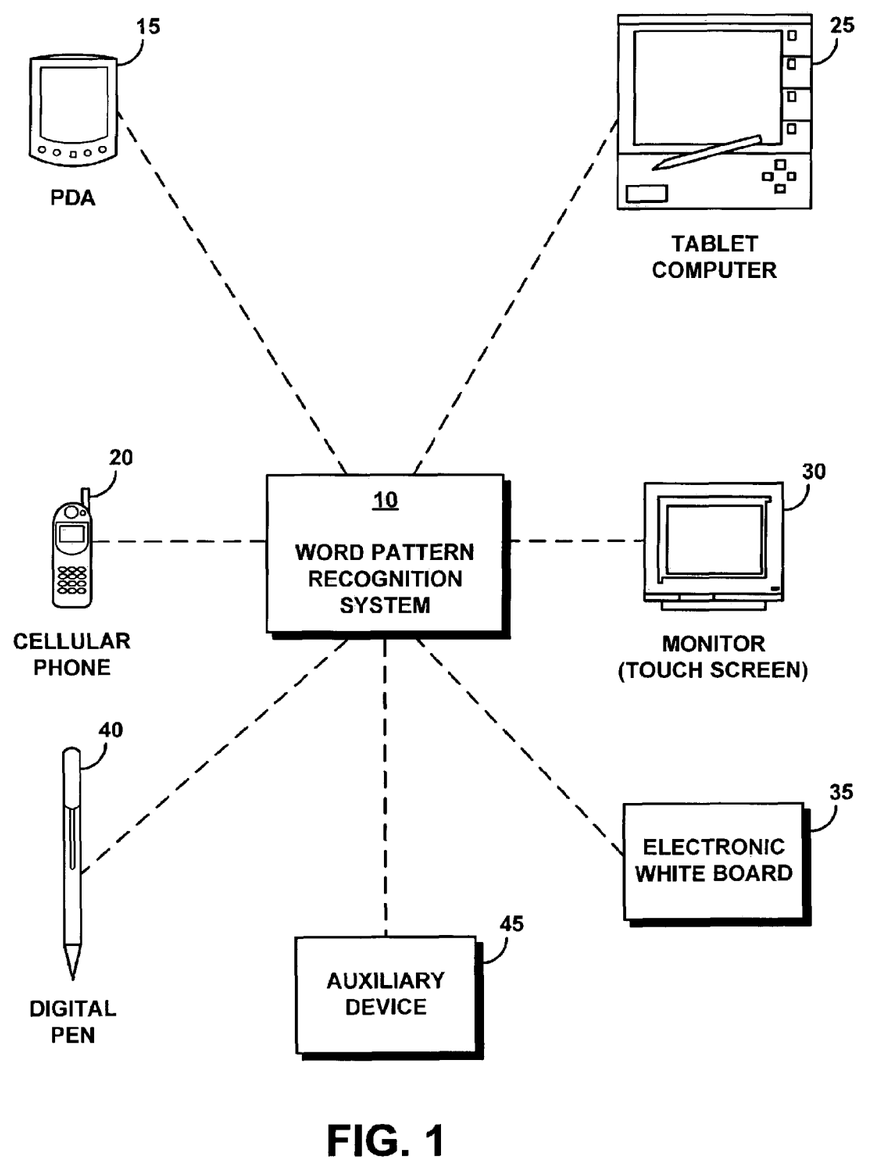
FIG. 1 is a schematic illustration of an exemplary operating environment in which a word pattern recognition system of the present invention can be used.

FIG. 1 portrays an exemplary overall environment in which a system 10 and associated method 200 for recognizing word patterns on a virtual keyboard according to the present invention may be used. System 10 includes a software programming code or computer program product that is typically embedded within, or installed on a computer. The computer in which system 10 is installed can be mobile devices such as a PDA 15 or a cellular phone 20. In addition, system 10 can be installed in devices such as tablet computer 25, touch screen monitor 30, electronic white board 35, and digital pen 40. System 10 can be installed in any device using a virtual keyboard or similar interface for entry, represented by auxiliary device 45. Alternatively, system 10 can be saved on a suitable storage medium such as a diskette, a CD, a hard drive, or like devices.

Figure 2A:
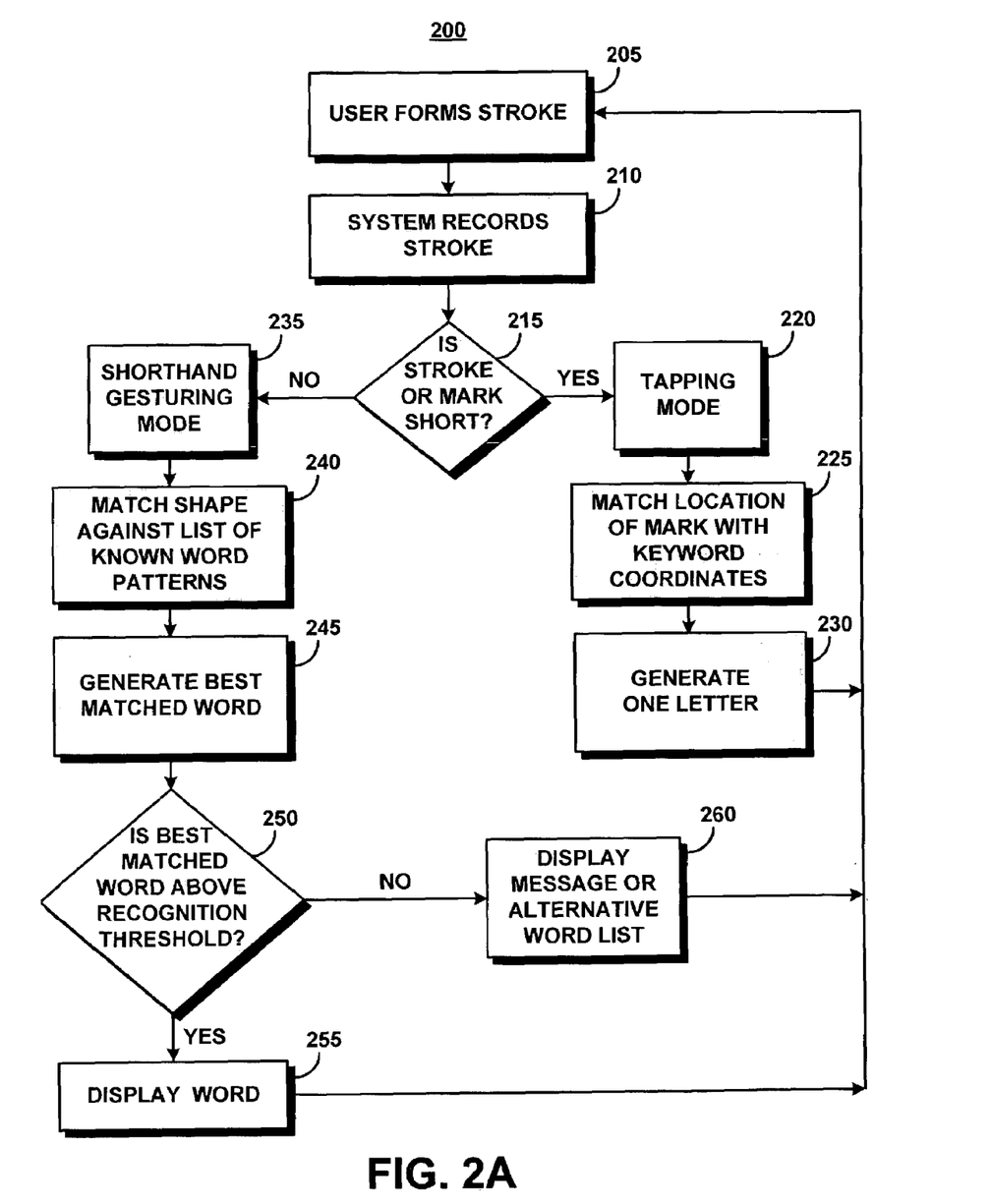
FIG. 2A represents a process flow chart that illustrates a preferred method of operation of the word pattern recognition system of FIG. 1.

With reference to FIG. 2A, a preferred method 200 of operation of system 10 is illustrated by a high-level flow chart. At block 205, the user forms a stroke on the virtual keyboard. The stroke can be short, as in a tap, or long, as in a shorthand gesture.

System 10 records the stroke at block 210. Then, at decision block 215, system 10 determines whether the stroke or mark was short. If not, the user is in tapping mode (block 220) and the system is instructed to select letters individually on a virtual keyboard. System 10 then correlates the user's tap with a letter by matching the location of the mark with keyboard coordinates at block 225, and by generating one letter at block 230. System 10 then returns to block 205 when the user forms another stroke.

If at decision block the user's stroke on the virtual keyboard is not short, the user is in shorthand gesturing mode (block 235). The recognition system of system 10 can be based on, for example, a classic elastic matching algorithm that computes the minimum distance between two sets of points by dynamic programming. One set of points is from the shape that a user produces on a stylus tablet or touch screen (i.e., an unknown shape). The other is from a prototype, i.e., an ideal shape defined by the letter key positions of a word. The recognition system can also be implemented by other hand writing recognition systems. Reference is made to "Charles C. Tappert, Ching Y. Suen, Toru Wakahara, "The State of the Art in On-Line Handwriting Recognition, IEEE Transactions on Pattern Analysis and Machine Intelligence," Vol.12, No.8, August 1990".

After preprocessing, filtering, and normalization in scale, system 10 matches the unknown shape against the known word parameters (block 240) by computing the distance between the unknown shape and the prototypes using elastic matching or other algorithms. The word corresponding that best matches the user's input sample above a certainty threshold is returned as the recognized word at block 245.

At decision block 250, system 10 determines whether the best matched word found at block 245 is above the desired recognition threshold. If the shorthand gesture formed by the user is clearly one word in the list of known word patterns, system 10 displays that word to the user at block 255.

System 10 then returns to block 205 when the user forms another stroke. If at decision block 250 more than one word is found to match the shorthand gesture, system 10 displays a message or alternative word to the user at block 260.

Figure 2B:
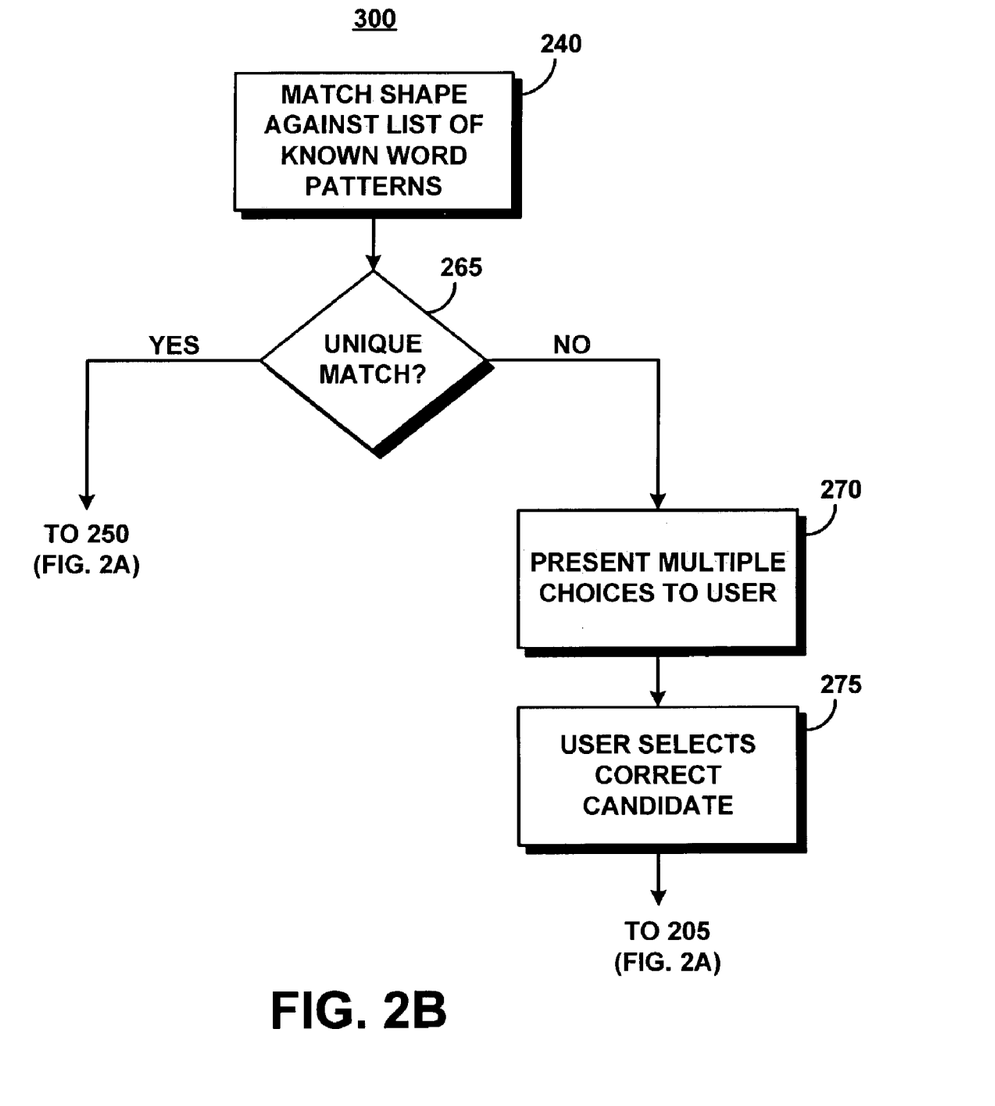
FIG. 2B represents a process flow chart that illustrates an alternative embodiment for the steps of matching the shorthand gesture against the list of known words and for generating the best matched word, for use in the operation of the word pattern recognition system of FIG. 1.

An alternative method 300 for matching the shorthand gesture against the list of known words and generating the best matched word is shown in FIG. 2B. If the result matching the shorthand gesture against a known list of words (block 240) is a unique match (decision block 265), system 10 proceeds to decision block 250, and proceeds as described earlier in connection with FIG. 2A.

Otherwise, system 10 presents to the user multiple choices that match the shorthand gesture at block 270. The user then selects the desired word from the candidates at block 275. System 10 then system returns to block 205 and proceeds as described earlier in connection with FIG. 2A.

Figure 3:
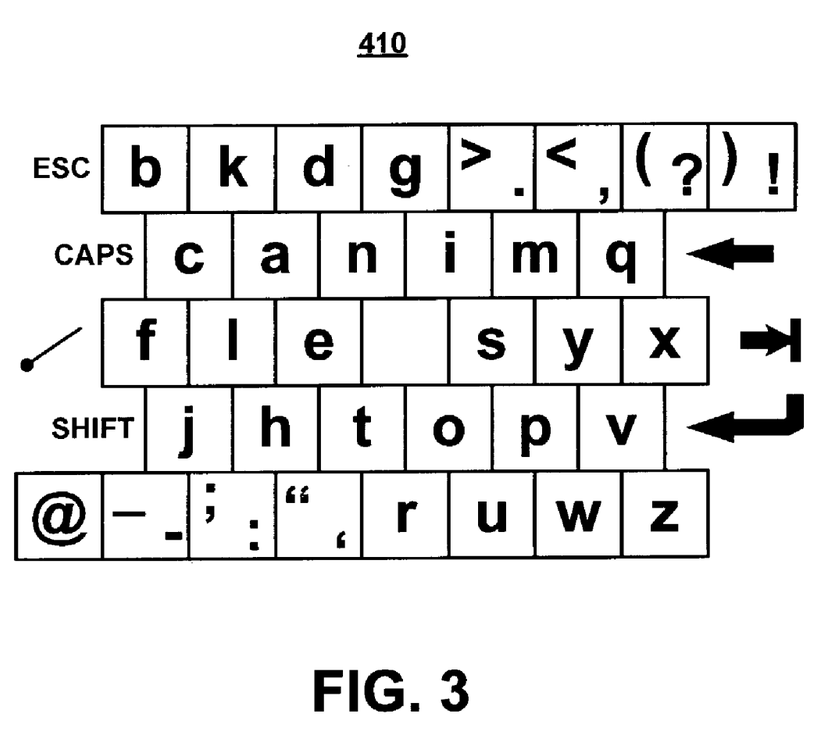
FIG. 3 is an exemplary virtual keyboard layout that can be used with the word pattern recognition system of FIGS. 1 and 2.

One aspect of the present system is its ability to handle ambiguity generated by shorthand gestures. The shape of a shorthand gesture is not always unique, particularly for some short words. This is illustrated by FIG. 3 that illustrates an exemplary virtual keyboard layout, referred to as the ATOMIK keyboard layout. For example, the words "can", "an", and "to" are completely identical when scale and location are ignored. The same is true for the words "do" and "no".

Figure 4A:
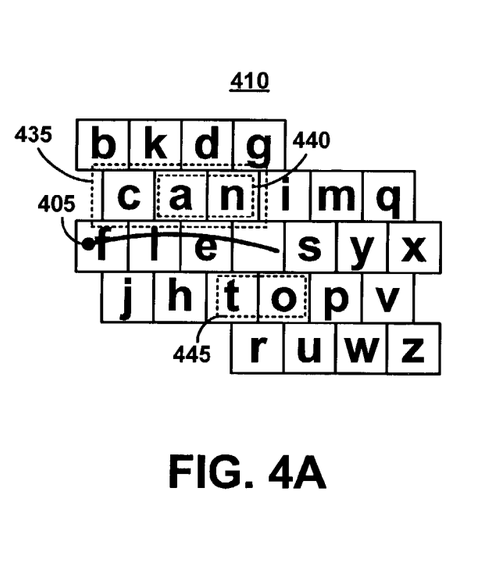
FIG. 4 is comprised of FIGS. 4A, 4B, 4C, and 4D, and represents an exemplary keyboard diagram illustrating one approach in which the word pattern recognition system of FIG. 1 resolves ambiguity in shorthand gestures.
Figure 4B:
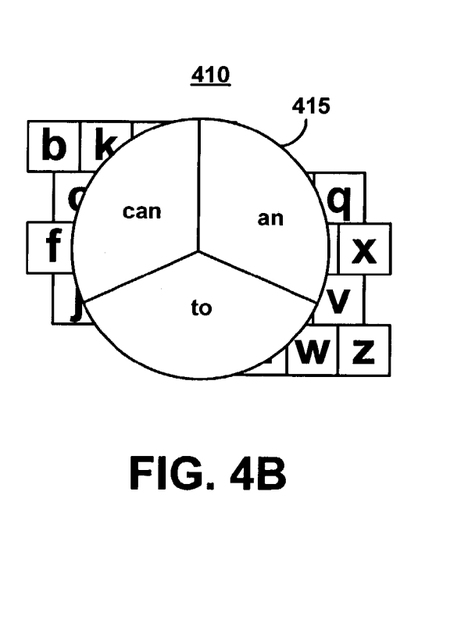
Figure 4C:
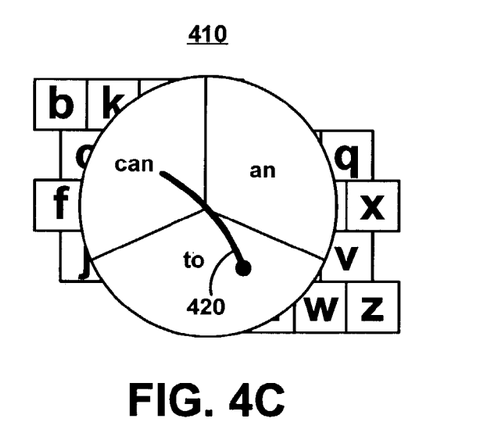

One method for resolving ambiguities in the alternative embodiment of FIG. 2B is through the use of transient pie menus. As shown in FIG. 4A, the user gestures for the word "can" a stroke 405 from left to right on a virtual keyboard 410. It should be noted that the stroke 405 does not need to carried out over the actual letters: c-a-n; but rather it could be made at any location on the virtual keyboard 410, so long as the stroke 405 connects the three letters: c-a-n. While the present invention is described in terms of a pie menu for exemplification purpose only, it should be clear that other known or available menus could alternatively be used, such as a linear menu.

The word pattern recognition system 10 finds more than one match to the gesture or stroke 405, "can", "an" and "do" (block 240 of FIG. 2B). In response, system 10 displays a pie menu 415 with all three candidate words in a consistent order (block 270). A user inexperienced with this particular ambiguous word would look at the menu and make a straight stroke 420 in the direction of the desired candidate on the pie chart, independent of location. With experience, the user will not have to look at the menu because the candidates are presented in a consistent segment of the pie.

Figure 4D:
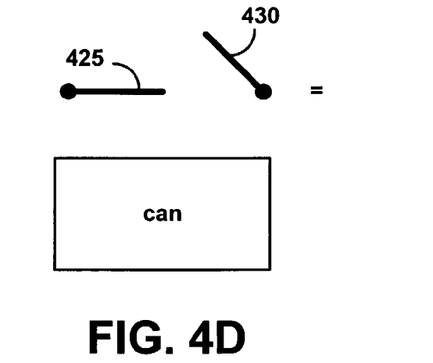

The selection of choice depends on direction only, regardless the location of the stroke. An experienced user may simply remember the second stroke as part of the shorthand for that word. For example, a right horizontal stroke 425 (FIG. 4D) followed by a stroke 430 to the upper-left direction will always be the word "can". Similarly, left and down is always the word "to" and a left stroke followed by a stroke to the upper right will always be the word "an".

Figure 5A:
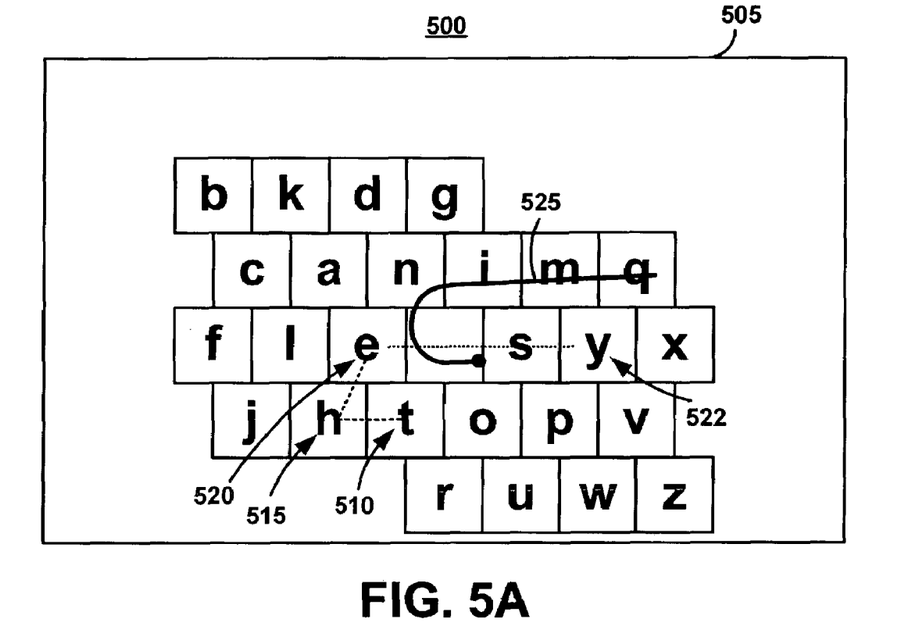
FIG. 5 is comprised of FIGS. 5A and 5B, and represents a screen shot of a virtual keyboard using the word pattern recognition system of FIG. 1 illustrating the input of the word "they".
Figure 5B:
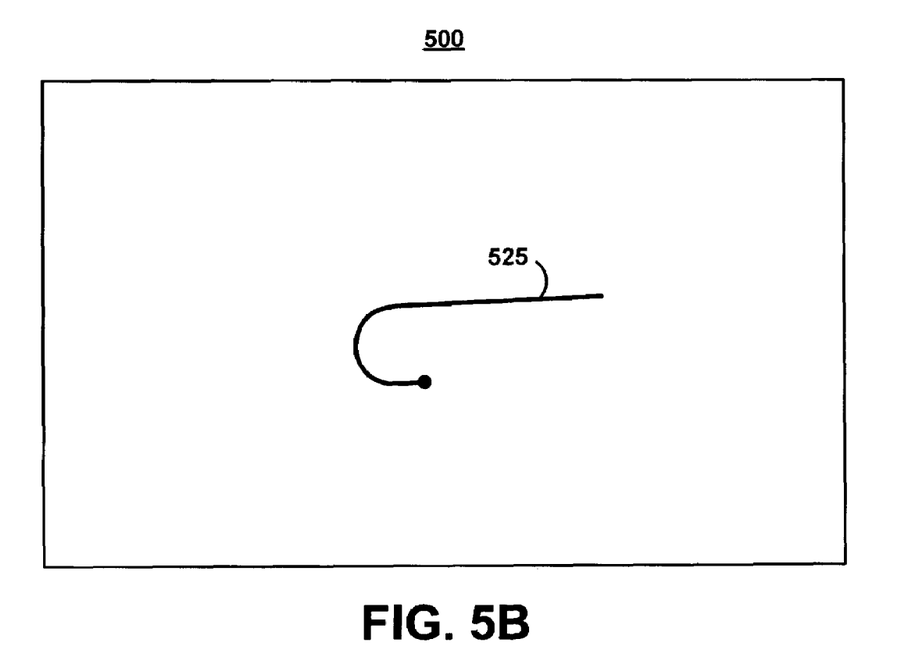

FIGS. 5A and 5B further illustrate the use of system 10. As seen in the screenshot 500 of a virtual keyboard system operating with system 10, the user is presented with a virtual keyboard such as the ATOMIK keyboard 505. The user wishes to enter the word "they". A novice user would tap the keys "t" 510, "h" 515, "e" 520, and y "522". As the user becomes more familiar with the pattern of these letters, the tapping sequence is replaced with the shorthand gesture 525 that follows the same pattern as tapped for the word "they". Eventually, the user will not need a keyboard for entry, simply entering the shorthand gesture 525 as shown in FIG. 5B.

Table 1 of the Appendix shows additional exemplary word patterns generated using system 10 based on the ATOMIK virtual keyboard layout.

It is to be understood that the specific embodiments of the invention that have been described are merely illustrative of certain application of the principle of the present invention. Numerous modifications may be made to the system and method for recognizing word patterns based on a virtual keyboard layout invention described herein without departing from the spirit and scope of the present invention. For example, the input unit may also be fragments of a word (such as "tion"), abbreviations (e.g. "asap") and alike whose patterns are defined on a virtual keyboard layout just as a word is. Moreover, while the present invention is described for illustration purpose only in relation to the ATOMIK virtual keyboard, it should be clear that the invention is applicable as well to any virtual keyboard layout.

Appendix

TABLE 1

| the | knowing |
| and | about |
| in | could |
| inside | think |
| have | people |

TABLE 1-continued

| has | after |
| had | right |
| having | because |
| he | between |
| him | before |
| his | through |
| it | place |
| its | become |
| they | such |
| them | change |
| was | point |
| their | system |
| not | group |
| for | number |
| you | however |
| your | again |
| she | world |
| her | course |

TABLE 1-continued

| | | | |
|---|---|---|---|
| with | | company | |
| on | | while | |
| that | | problem | |
| this | | against | |
| these | | service | |
| those | | never | |
| did | | house | |
| does | | down | |
| done | | school | |
| doing | | report | |
| are | | start | |
| our | | country | |
| from | | really | |
| which | | provide | |
| will | | local | |
| were | | member | |
| said | | within | |
| can | | always | |
| whose | | follow | |
| went | | without | |

TABLE 1-continued

| | | | |
|---|---|---|---|
| gone | | during | |
| other | | bring | |
| another | | although | |
| being | | example | |
| seeing | | question | |
| knew | | | |

What is claimed is:

1. A method of recognizing word patterns, comprising:
defining word patterns of a plurality of known words by a plurality of paths,
wherein each path connects elements in a word on a virtual keyboard layout;
accepting an input as a stroke based on a virtual keyboard layout;
matching the inputted stroke to a word having a word pattern that approximates the inputted stroke; and
generating the matched word having the word pattern that approximates the inputted stroke.

2. The method of claim 1, further comprising displaying the matched word.

3. The method of claim 2, further comprising analyzing the input to differentiate between a tapping input and a stroke input.

4. The method of claim 3, wherein generating the matched word comprises generating at least one matched candidate word based on the stroke input.

5. The method of claim 4, wherein generating the at least one matched candidate word comprises comparing the at least one matched candidate word to a predetermined matching threshold.

6. The method of claim 3, wherein the input comprises the tapping input that represents at least one element of the word.

7. The method of claim 4, wherein displaying the matched word comprises displaying a plurality of candidate matched words in a graphical format.

8. The method of claim 7, wherein the graphical format includes a pie chart graphical display.

9. The method of claim 7, further comprising selecting a desired candidate matched word from the displayed candidate matched words by accepting a gesture input in a direction of the desired candidate matched word.

10. The method of claim 1, wherein the virtual keyboard layout matches a physical keyboard layout.

11. A computer program product having executable instruction codes stored on a computer-readable medium, for recognizing word patterns, comprising:

a set of instruction codes for defining word patterns of a plurality of known words by a plurality of paths, wherein each path connects elements in a word on a virtual keyboard layout;

a set of instruction codes for accepting an input as a stroke based on a virtual keyboard layout;

a set of instruction codes for matching the inputted stroke to a word having a word pattern that approximates the inputted stroke; and a set of instruction codes for generating the matched word having the word pattern that approximates the inputted stroke.

12. The computer program product of claim 11, further comprising a set of instruction codes for displaying the matched word.

13. The computer program product of claim 12, further comprising a set of instruction codes for differentiating between a tapping input and a stroke input.

14. The computer program product of claim 13, wherein the set of instruction codes for generating the matched word comprises generating at least one matched candidate word based on the stroke input.

15. The computer program product of claim 14, wherein the set of instruction codes for generating the at least one matched candidate word compares the at least one matched candidate word to a predetermined matching threshold.

16. The computer program product of claim 13, wherein the input comprises the tapping input that represents at least one one element of the word.

17. The computer program product of claim 14, wherein the set of instruction codes for displaying the matched word comprises displaying a plurality of candidate matched words in a graphical format.

18. The computer program product of claim 17, wherein the the graphical format includes a pie chart graphical display.

19. The computer program product of claim 17, further comprising a set of instruction codes for selecting a desired candidate matched word from the displayed candidate matched words by accepting a gesture input in a direction of the desired candidate matched word.

20. The computer program product of claim 11, wherein the virtual keyboard layout matches a physical keyboard layout.

21. A system for recognizing word patterns, comprising:
means for defining word patterns of a plurality of known words by a plurality of paths, wherein each path connects elements in a word on a virtual keyboard layout;
means for accepting an input as a stroke based on a virtual keyboard layout;
means for matching the inputted stroke to a word having a word pattern that approximates the inputted stroke; and
means for generating the matched word having the word pattern that approximates the inputted stroke.

22. The system of claim 21, further comprising means for displaying the matched word.

23. The system of claim 22, further comprising means for differentiating between a tapping input and a stroke input.

24. The system of claim 23, wherein the means for generating the matched word comprises generating at least one matched candidate word based on the stroke input.

25. The system of claim 24, wherein the means for generating the at least one matched candidate word comprises means for comparing the at least one matched candidate word to a predetermined matching threshold.

26. The system of claim 23, wherein the input comprises the tapping input that represents at least one element of the word.

27. The system of claim 24, wherein the means for displaying the matched word displays a plurality of candidate matched words in a graphical format.

28. The system of claim 27, wherein the graphical format includes a pie chart graphical display.

29. The system of claim 27, further comprising an input device for selecting a desired candidate matched word from the displayed candidate matched words by accepting a gesture input in a direction of the desired candidate matched word.

30. The system of claim 21, wherein the virtual keyboard layout matches a physical keyboard layout.

31. The method of claim 1, wherein the virtual keyboard layout comprises alphabetical letters.

32. The method of claim 1, wherein the virtual keyboard layout comprises punctuations that correspond to the elements of the word.

33. The method of claim 1, wherein the virtual keyboard layout comprises symbols that correspond to the elements of the word.

34. The method of claim 33, wherein the symbols comprise phonetic symbols.

35. The method of claim 1, wherein the virtual keyboard layout comprises elements in a non-alphabetical language that correspond to the elements of the word.

36. The method of claim 1, wherein the known words comprise a finite number of fragments of words.

37. The method of claim 1, wherein the known words comprise a finite number of names.

38. The method of claim 1, wherein the known words comprise a finite number of abbreviations.

39. The method of claim 1, further comprising inputting the stroke by any one of a digital pen and a stylus, on a sensing surface.

40. The method of claim 1, further comprising inputting the stroke by a hand gesture on a sensing surface.

41. The computer program product of claim 11, wherein the virtual keyboard layout comprises alphabetical letters.

42. The computer program product of claim 11, wherein the virtual keyboard layout comprises punctuations that correspond to the elements of the word.

43. The computer program product of claim 11, wherein the virtual keyboard layout comprises symbols that correspond to the elements of the word.

44. The computer program product of claim 43, wherein the symbols comprise phonetic symbols.

45. The computer program product of claim 11, wherein the virtual keyboard layout comprises elements in a non-alphabetical language that correspond to the elements of the word.

46. The computer program product of claim 11, wherein the known words comprise a finite number of fragments of words.

47. The computer program product of claim 11, wherein the known words comprise a finite number of names.

48. The computer program product of claim 11, wherein the known words comprise a finite number of abbreviations.

49. The computer program product of claim 11, further comprising inputting the stroke by any one of a digital pen and a stylus, on a sensing surface.

50. The computer program product of claim 11, further comprising inputting the stroke by a hand gesture on a sensing surface.

51. The system of claim 21, wherein the virtual keyboard layout comprises alphabetical letters.

52. The system of claim 21, wherein the virtual keyboard layout comprises punctuations that correspond to the elements of the word.

53. The system of claim 21, wherein the virtual keyboard layout comprises symbols that correspond to the elements of the word.

54. The system of claim 53, wherein the symbols comprise phonetic symbols.

55. The system of claim 21, wherein the virtual keyboard layout comprises elements in a non-alphabetical language that correspond to the elements of the word.

56. The system of claim 21, wherein the known words comprise a finite number of fragments of words.

57. The system of claim 21, wherein the known words comprise a finite number of names.

58. The system of claim 21, wherein the known words comprise a finite number of abbreviations.

59. The system of claim 21, further comprising means for inputting the stroke by any one of a digital pen and a stylus, on a sensing surface.

60. The system of claim 21, further comprising means for inputting the stroke by a hand gesture on a sensing surface.

* * * * *